US011977658B1

(12) United States Patent
Ketharaju

(10) Patent No.: US 11,977,658 B1
(45) Date of Patent: May 7, 2024

(54) COMPOSITE BIOMETRIC AUTHENTICATION

(71) Applicant: Wells Fargo Bank, N.A., San Francisco, CA (US)

(72) Inventor: Rameshchandra Bhaskar Ketharaju, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 18/163,068

(22) Filed: Feb. 1, 2023

Related U.S. Application Data

(63) Continuation of application No. 17/445,034, filed on Aug. 13, 2021, now Pat. No. 11,599,670, which is a continuation of application No. 16/558,217, filed on Sep. 2, 2019, now Pat. No. 11,120,159.

(51) Int. Cl.
| | |
|---|---|
| *G06F 21/62* | (2013.01) |
| *G06F 21/32* | (2013.01) |
| *G06F 21/44* | (2013.01) |
| *G06F 21/50* | (2013.01) |
| *H04L 9/40* | (2022.01) |

(52) U.S. Cl.
CPC .......... *G06F 21/6245* (2013.01); *G06F 21/32* (2013.01); *G06F 21/445* (2013.01); *G06F 21/50* (2013.01); *H04L 63/102* (2013.01)

(58) Field of Classification Search
None
See application file for complete search history.

(56) References Cited

U.S. PATENT DOCUMENTS

| | | |
|---|---|---|
| 6,697,947 B1 | 2/2004 | Matyas, Jr. et al. |
| 6,735,695 B1 | 5/2004 | Gopalakrishnan et al. |
| 7,111,174 B2 | 9/2006 | Hamid |
| 7,130,452 B2 | 10/2006 | Bolle et al. |
| 7,318,041 B2 | 1/2008 | Walker et al. |
| 7,614,551 B2 | 11/2009 | Kingsley-Hefty |

(Continued)

OTHER PUBLICATIONS

Grewal, S. K. (2014). A Composite Approach for Biometric Template Security. In International Journal and Conference Service Center (IJCSC) (vol. 5, No. 1, pp. 170-176). (Year: 2014).*

*Primary Examiner* — Richard A McCoy
(74) *Attorney, Agent, or Firm* — K&L Gates LLP

(57) ABSTRACT

Composite biometric authentication is provided to multiple users that share a financial account. The users can enroll the account for composite biometric authentication. The enrollment can include recording multiple biometrics of each user and storing them as a composite to use in authenticating user requests to authorize transactions involving the shared financial account. A unique combination of biometrics can be generated including a biometric of the multiple biometrics of each of the users and stored such that the unique combination must be provided to authenticate a future user request. To proceed with a transaction, a user of the multiple users initiates the transaction and provides their part of the unique combination. The other users provide their part of the unique combination by providing the specific biometric of the multiple biometrics they have previously provided. The transaction proceeds when all shares of the unique combination are provided and authenticated.

20 Claims, 7 Drawing Sheets

(56) References Cited

U.S. PATENT DOCUMENTS

| | | |
|---|---|---|
| 7,793,109 B2 | 9/2010 | Ortiz |
| 7,921,297 B2 | 4/2011 | Ortiz et al. |
| 8,370,262 B2 * | 2/2013 | Blessing .................. G06F 21/32 340/5.1 |
| 8,751,801 B2 | 6/2014 | Harris et al. |
| 9,614,842 B2 | 4/2017 | Shim et al. |
| 9,626,498 B2 | 4/2017 | Gay et al. |
| 9,646,216 B2 | 5/2017 | Baca et al. |
| 9,825,927 B2 | 11/2017 | O'Hare et al. |
| 9,852,279 B2 | 12/2017 | Shim et al. |
| 9,985,950 B2 | 5/2018 | Caterino et al. |
| 10,003,596 B2 | 6/2018 | Shim et al. |
| 10,091,195 B2 | 10/2018 | Linderemann |
| 10,102,415 B1 | 10/2018 | Lee |
| 10,289,865 B1 | 5/2019 | Sokolov et al. |
| 10,572,641 B1 | 2/2020 | Griffin et al. |
| 10,764,281 B1 | 9/2020 | Gaeta et al. |
| 2009/0183008 A1 | 7/2009 | Jobmann |
| 2015/0046990 A1 | 2/2015 | Oberheide et al. |
| 2015/0237045 A1 | 8/2015 | Blessing |
| 2015/0358316 A1 | 12/2015 | Cronin |
| 2015/0363586 A1 | 12/2015 | Klevan et al. |
| 2015/0379253 A1 | 12/2015 | Cook et al. |
| 2016/0034708 A1 | 2/2016 | Shim et al. |
| 2016/0036811 A1 | 2/2016 | Shim et al. |
| 2017/0141920 A1 | 5/2017 | Herder, III et al. |
| 2018/0316671 A1 | 11/2018 | Brown |
| 2019/0042716 A1 | 2/2019 | Kaga et al. |
| 2019/0172281 A1 * | 6/2019 | Einberg ................... G07C 9/27 |
| 2020/0067705 A1 | 2/2020 | Brown et al. |
| 2020/0220870 A1 * | 7/2020 | Wagner ............... G06F 21/6245 |
| 2020/0413260 A1 | 12/2020 | Mendez et al. |

\* cited by examiner

COMPOSITE BIOMETRIC AUTHENTICATION

CROSS-REFERENCE TO RELATED APPLICATIONS

This application is a continuation of U.S. patent application Ser. No. 17/445,034, filed Aug. 13, 2021, which is a continuation of U.S. patent application Ser. No. 16/558,217 filed Sep. 2, 2019 and issued as U.S. Pat. No. 11,120,159, both of which are incorporated herein by reference in their entireties.

BACKGROUND

In the banking industry, conventional authentication methods are somewhat limited given the complexity and variability of banking needs of various customers. For example, in the case of joint account holders where the account holders are not co-located and the one holder requires his or her authentication to transact an account, the options are limited unless the first holder physically travels to where the bank account is being held or provides paperwork such as a power of authorization/attorney. Such agreements may be problematic or suboptimal for the second user without a check on the first user's access to the account.

Other problems that arise with the conventional authentication systems are over simplicity, which exposes various customers to heightened risks. For example, to transact at a bank, some customers are required to enter a personal identification number (PIN). PINs are susceptible as they are often easily guessable such as either a birthday or anniversary. Solutions such as one time passcodes (OTP) have been implemented. However, they are limited because mobile phones may be compromised, lost, or otherwise unsecured.

Moreover, conventional authentication methods are either predicable or singular in nature in that only one level of authentication and/or authorization is required. For example, the simple entry of a password often enables access to a customer's bank account information. In some cases, an additional OTP is sent for an extra level of verification. However, the simple login is often inadequate.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The subject disclosure generally pertains to composite biometric authentication. Multiple users share a financial account. The users can enroll the account for composite biometric authentication. The enrollment can include recording multiple biometrics of each of the users and storing them as a composite to use in authenticating user requests to authorize transactions involving the shared financial account. A unique combination of biometrics can be generated to include a biometric of the multiple biometrics of each of the users and stored such that the unique combination must be provided to authenticate a future user request. To proceed with a transaction, a user of the multiple users initiates the transaction and provides their biometric part of the unique combination. The other users are prompted and thereby provide their biometric part of the unique combination by providing the specific biometric of the multiple biometrics they have previously provided. The transaction proceeds when all biometric parts of the unique combination are provided and authenticated.

In aspects, the subject innovation provides substantial benefits in terms of authentication and transactional security. One advantage resides in a more secure knowledge of the identity of a user(s). Another advantage resides in more complete control of a shared account by all account holders of the shared account.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings.

DETAILED DESCRIPTION

The subject disclosure generally pertains to composite biometric authentication. In examples, multiple user share a single financial account. The users can enroll the account for authentication via composite biometric authentication. The enrollment can include recording multiple biometrics of each of the users and storing them together as a composite to use in authenticating user requests to authorize transactions involving the shared financial account. A unique combination (e.g., morphing) of biometrics can be generated to include a biometric of the multiple biometrics of each of the users and stored such that the unique combination must be provided to authenticate a future user request. To proceed with a transaction, a user of the multiple users initiates the transaction and provides their biometric part/input of the unique combination. The other users (e.g., account holders)

provide their biometric part of the unique combination by providing the specific biometric of the multiple biometrics they have previously provided. The transaction proceeds when all biometric parts of the unique combination are provided and authenticated by the system.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to incorporate all modifications, equivalents, and alternatives falling within the spirit and scope of this specification and claims appended hereto.

Figure 1:
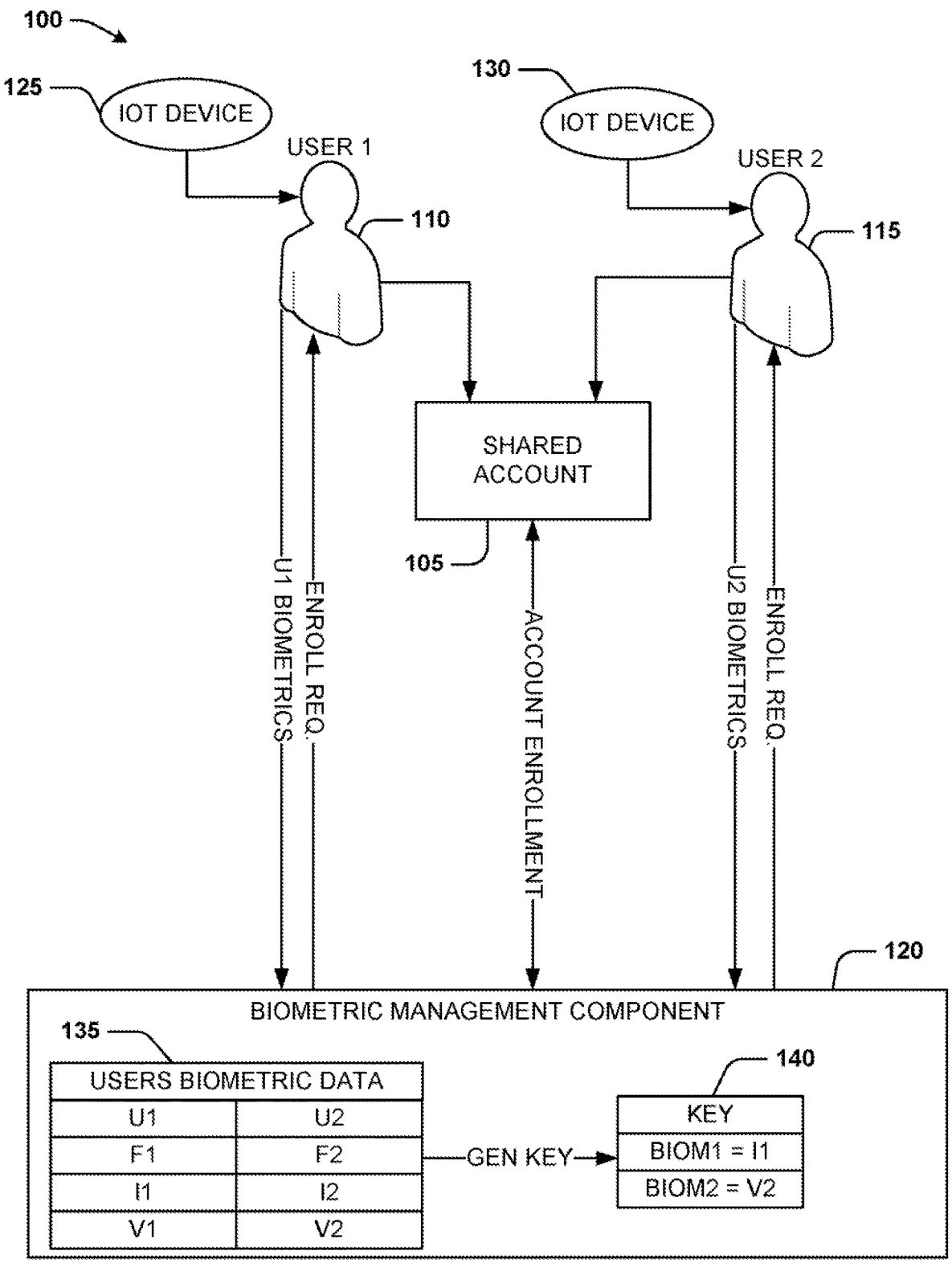
FIG. 1 illustrates a system diagram for enrollment for composite biometric authentication in accordance with aspects of the innovation.

FIG. 1 illustrates an example system 100 that facilitates enrollment of users for composite biometric authentication. As described herein, composite biometric authentication describes the use of combining or otherwise morphing biometric factors of multiple users in order to authenticate and authorize access to a shared account 105. In an example, shared account 105 an be a bank account, family trust, investment account, safety deposit box, JOT device and/or the like. Upon successful composite biometric authentication, the shared account 105 may be accessed by multiple users. The shared account 105 can be accessed by a first user (User 1) 110 and/or a second user (User 2) 115. For example, a joint checking account can be accessed by a husband and a wife separately upon successful biometric authentication.

Continuing with the checking account example, the shared account 105 can be enrolled via a biometric management component 120. The shared account 105 can be enrolled or set-up by the biometric management component 120 by receiving authorization from the multiple users (e.g., 110, 115) that share or have access to the shared account 105. The multiple users, e.g. the first user 110 and the second user 115, can elect to have the shared account 105 be enrolled for composite biometric authentication. In some embodiments, business rules can govern whether a specific type of account or part of an account can trigger enrollment in composite biometric authentication. For example, a business rule may dictate that a joint account having a total value above a threshold automatically triggers account enrollment in composite biometric authentication. Similarly, rules and thresholds can be set that trigger composite biometric authentication for specific types of transactions, e.g., withdrawals of cash in excess of predetermined amount, withdrawals from risky locations, withdrawals at specific dates and/or times, etc.

In operation, the biometric management component 120 can send enrollment requests to the first user 110 and the second user 115. The enrollment requests can include a request for each user to provide a set of biometric references of themselves. In some embodiments, the first user 110 and the second user 115 appear in person at a financial institution or the like to provide the set of biometric references of themselves and enroll the shared account 105. In other embodiments, the first user 110 provides their set of biometric references via a first IOT device 125 and the second user 115 provide their set of biometric references via a second IOT device 130.

The first IOT device 125 and/or second IOT device 130 can include a biometric scanner to record a set of biometric references of the respective users. The biometric scanner can record biometric references such as, but not limited to, fingerprints, irises, voice, gait, facial data, blood vessel patterns. DNA, and/or other biometric data specific to identify and/or authenticate each user.

The biometric management component 120 receives a first set of biometric references from the first user 110 and a second set of biometric references from the second user 115. The biometric management component 120 stores the first user's 110 and the second user's 115 sets of biometric references in a biometric composite 135. In some embodiments, the biometric management component 120 stores the biometric composite 135 in a server, database, hard disk drive, cloud application, another storage solution, and/or the like.

For ease of explaining the innovation, the shared account 105 is described having a first user 110 and a second user 115. However, it is contemplated that more than two users may have access to a shared account and provide their biometrics. For example, Table I depicts a biometric composite of four users (U1, U2, U3, U4) having fingerprint (F1, F2, F3, F4), iris (I1, I2, I3, I4), and voice (V1, V2, V3, V4) biometric references of each user.

TABLE 1

| USER | $U_1$ | $U_2$ | $U_3$ | $U_4$ |
| FINGER | $F_1$ | $F_2$ | $F_3$ | $F_4$ |
| IRIS | $I_1$ | $I_2$ | $I_3$ | $I_4$ |
| VOICE | $V_1$ | $V_2$ | $V_3$ | $V_4$ |

The biometric management component 120 can generate a reference composite biometric key 140 from the biometric composite 135. The reference composite biometric key 140 can be a combination of one biometric reference from the first user 110, e.g. one of F1, I1, or V1, and a second biometric reference from the second user 115. e.g. one of F2, I2, or V2, associated with the shared account 105. For example, the first user 110 and the second user 115 have each submitted (in the enrollment phase) a fingerprint (F1, F2), an iris (I1, I2), and a voice (V1, V2). The biometric management component 120 can generate a reference biometric composite key 140 that includes the iris reference of the first user, I1, and the voice reference of the second user, V2. The reference biometric composite key 140 can be stored by the biometric management component 120. In some embodiments, enrollment is completed when the reference biometric composite key 140 is created. In other embodiments, enrollment is completed when the multiple users have submitted the set (or a subset) of biometric references.

In some embodiments, the reference composite biometric key 140 is generated by a randomized selection of one (or more) of the biometric references of the first user 110 in the biometric composite 135 and a randomized selection of one (or more) of the biometric references of the second user 115 in the biometric composite 135. In some embodiments, the randomizing can be performed by a randomizing algorithm. In other embodiments, the randomizing can factor in previous reference composite biometric keys using machine learning and/or artificial intelligence techniques such that composite biometric keys are not repeated or easily guessed. In other embodiments, the reference composite biometric key 140 is selected during enrollment by the first user 110 and/or the second user 115.

In some embodiments, the biometric management component 120 can generate multiple reference composite biometric keys. The multiple reference composite biometric keys can be user specific. The biometric management component 120 can generate a first user-specific reference composite biometric key for the first user and associate the first user-specific reference biometric key with the first user 110. The biometric management component 120 can generate a second user-specific reference composite biometric key for the second user and associate the second user-specific reference biometric key with the second user 110. The first user-specific reference composite biometric key and second user-specific reference composite biometric key each include at least one biometric from the first user and at least one biometric from the second user. For example, the first user-specific reference composite biometric key can be <F1, I2> and the second user-specific reference composite biometric key can be <V1, F2>.

In the embodiment, if a user request is from the first user 110, the user request is authenticated using the first user-specific reference composite biometric key associated with the first user 110. If a user request is from the second user 115, the user request is authenticated using the second user-specific reference composite biometric key associated with the second user 115. Processing user requests are described in further detail below.

In some embodiments, the first user 110 and the second user 115 can provide a same biometric reference type to the biometric management component 120. In this embodiment, the biometric management component 120 combines the first biometric reference and the second biometric reference to generate the reference composite biometric key 140. The combining may utilize a combination algorithm that mixes the two biometric references into a single biometric reference representative of both biometric references. For example, the first user 110 and the second user 115 can provide first facial reference and second facial reference of themselves respectively. The biometric management component 120 combines (or morphs) the facial references from the first user 110 and the second user 115 into a facial reference composite biometric key representing a face that does not appear to look like either the first user 110 or the second user 115 and represents both. This can be beneficial to each user as the biometric management 120 component stores a facial reference that does not look exactly like either of the users and therefore may better protect their identities.

Figure 2:
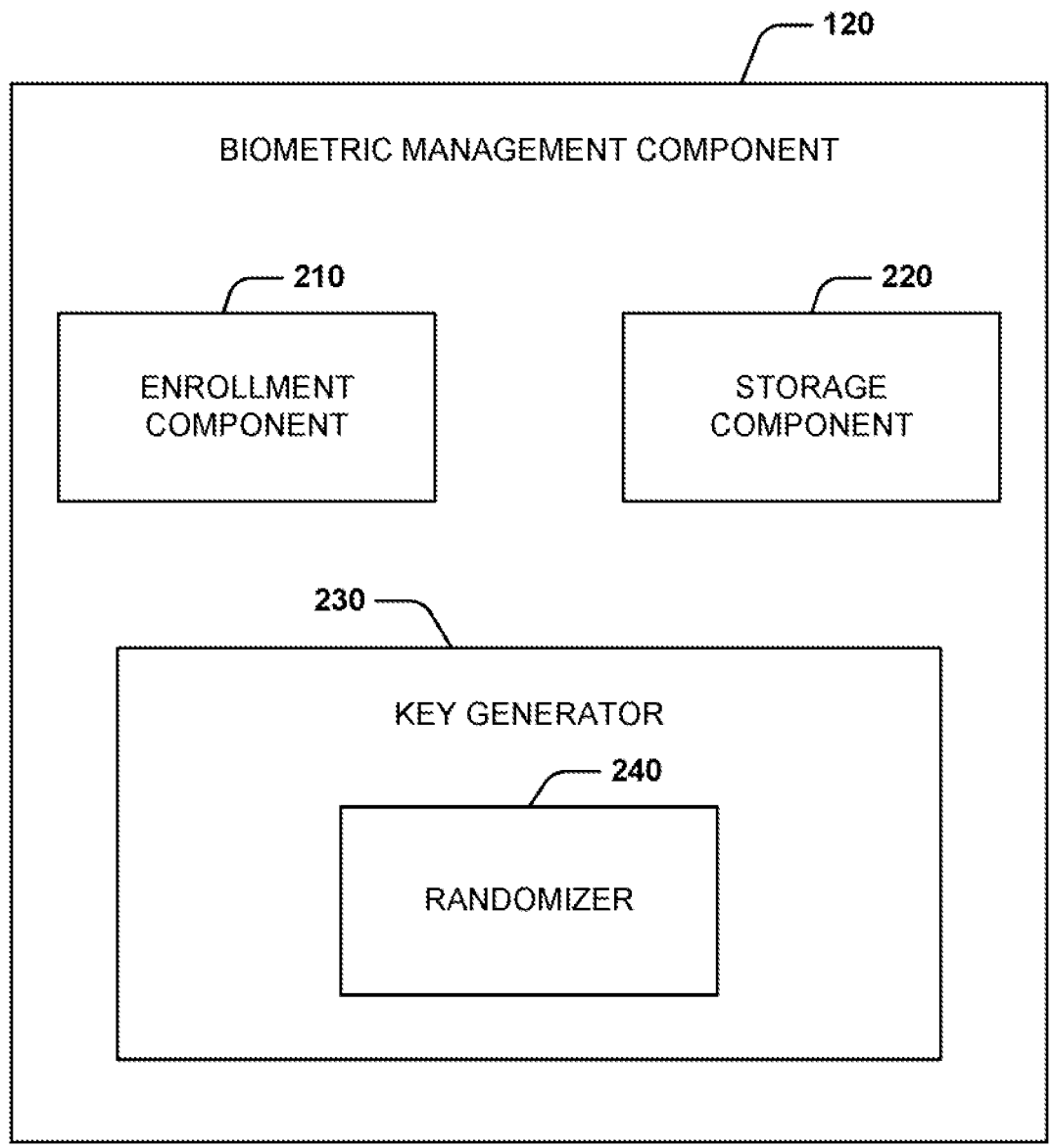
FIG. 2 illustrates an example component diagram of a biometric management component in accordance with aspects of the innovation.

FIG. 2 illustrates an example component diagram of a biometric management component 120. The biometric management component 120 includes an enrollment component 210. As described with reference to FIG. 1, the enrollment component 210 enrolls the shared account 105, the first user 115 and the second user 110 to employ composite biometric authentication. The shared account 105 can be enrolled by the enrollment component 210 by receiving authorization from the first user 110 and/or the second user 115 that share or have access to the shared account 105. In some embodiments, the enrollment component 210 utilizes business rules to govern whether a specific type of account or part of an account trigger enrollment in composite biometric authentication. For example, a business rule may be a joint account having a total value above a threshold can trigger account enrollment in composite biometric authentication.

The enrollment component 210 can send enrollment requests to the first user 110 and second user 115. The enrollment requests can include a request for each user to provide a set of biometric references of themselves. In some embodiments, the first user 110 and the second user 115 appear in person at a financial institution or the like to provide the set of biometric references of themselves and enroll the shared account 105. In other embodiments, the first user 110 provides their set of biometric references via the first IOT device 125 and the second user 115 provide their set of biometric references via the second IOT device 130.

The enrollment component 210 receives a first set of biometric references from the first user 110 and a second set of biometric references from the second user 115. The biometric management component 120 stores each user's set of biometric references as a biometric composite 135 in a storage component 220. In some embodiments, the storage component 220 stores the biometric composite 135 in a server, database, hard disk drive, cloud application, another storage solution, and/or the like.

The biometric management component 120 includes a key generator 230. The key generator 230 can generate a reference composite biometric key 140 from the biometric composite 135. The reference composite biometric key 140 can be a combination of a biometric reference(s) from the first user 110 and a second biometric reference(s) from the second user 115 associated with the shared account 105. For example, the first user 110 and the second user 115 have each submitted a fingerprint (F1, F2), an iris (I1, I2), and a voice (V1, V2). The key generator 230 can generate a reference composite biometric key 140 that includes the iris reference of the first user, I1, and the voice reference of the second user, V2. The reference composite biometric key 140 can be stored by the storage component 220. In some embodiments, the enrollment component 210 determines enrollment is completed when the reference composite biometric key 140 is created by the key generator 230. In other embodiments, the enrollment component 210 determines enrollment is completed when the multiple users have submitted a set (or a subset) of biometric references. While the example(s) described herein employ a single biometric reference from users in generation of a composite biometric key, it is to be appreciated that the key may employ multiple biometric references from one or more of the users of an account in the authentication process. These alternative embodiments are to be included within the spirit and/or scope of the innovation and claims appended hereto.

In some embodiments, the key generator 230 generates the reference composite biometric key 140 using a randomizer 240. The randomizer 240 can generate the reference composite biometric key 140 using a randomized selection of one of the biometric references of the first user 110 in the biometric composite 135 and a randomized selection of one of the biometric references of the second user 115 in the biometric composite 135. In some embodiments, the randomizer 240 can randomize using a randomizing algorithm. In other embodiments, the key generator 230 can factor in previous reference composite biometric keys using machine learning and/or artificial intelligence techniques such that reference composite biometric keys are not repeated or easily guessed. In other embodiments, the reference composite biometric key 140 is selected during enrollment by the first user 110 and/or the second user 115.

In some embodiments, the key generator 230 can generate multiple reference composite biometric keys. The multiple reference composite biometric keys can be user specific. The key generator 230 can generate a first user-specific reference composite biometric key for the first user 110 and associate the first user-specific reference biometric key with the first user 110. The key generator 230 can generate a second user-specific reference composite biometric key for the second user 115 and the second user-specific reference composite biometric key is associated with the second user 115. The first user-specific reference composite biometric key and second user-specific reference composite biometric key each include a biometric from the first user 110 and a biometric from the second user 115. For example, the first user-specific reference composite biometric key can be <F1, I2> and the second user-specific reference composite biometric key can be <V1, F2>. In some embodiments, each user specific reference composite biometric key may be used individually based on which user submits a user request regarding the account or be used in combination such that the users authenticate one another.

In the embodiment, if a user request is from the first user 110, the user request is authenticated using the first user-specific reference composite biometric key associated with the first user. If a user request is from the second user 115, the user request is authenticated using the second user-specific reference composite biometric key associated with the second user 115. Processing user requests are described in further detail below.

Figure 3:
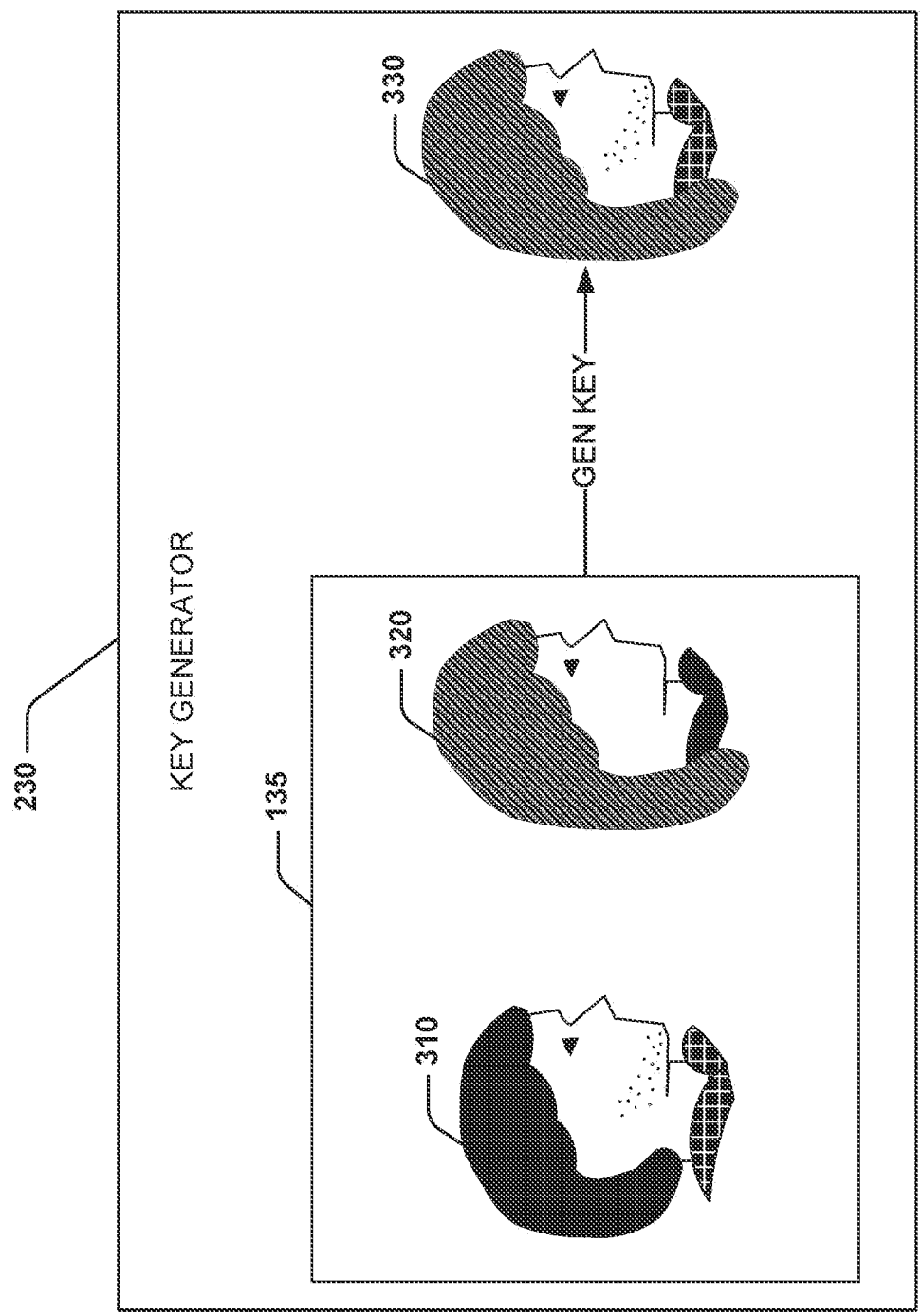
FIG. 3 illustrates a particular embodiment of the key generator of FIG. 2 in accordance with an aspect of the innovation.

FIG. 3 illustrates a particular embodiment of the key generator 230 that generates a reference composite biometric key from two of the same biometric reference type. In some embodiments, the first user 110 and the second user 115 can provide a first biometric reference 310 and a second biometric reference 320 that have a same biometric reference type to enrollment component to generate the biometric composite 135. In this embodiment, the key generator 230 combines the first biometric reference 310 and the second biometric reference 230 to generate a reference composite biometric key 330. The combining may utilize a combination algorithm that mixes or morphs the two biometric references into a single biometric representative of both biometrics. The combining results in a single reference composite biometric key 330 that represents both. For example, the first user 110 and the second user 115 can provide facial references of themselves respectively. The key generator 230 combines the first facial reference 310 from the first user 110 and the and the second facial reference 320 from the second user 115 into a facial reference composite biometric key 330 representing a face that does not appear to look exclusively like either the first user 110 or the second user 115 and represents both. This can be beneficial to each user as the storage component 220 stores a face reference that does not look exactly like either of the users and therefore may better protect user identities.

Figure 4:
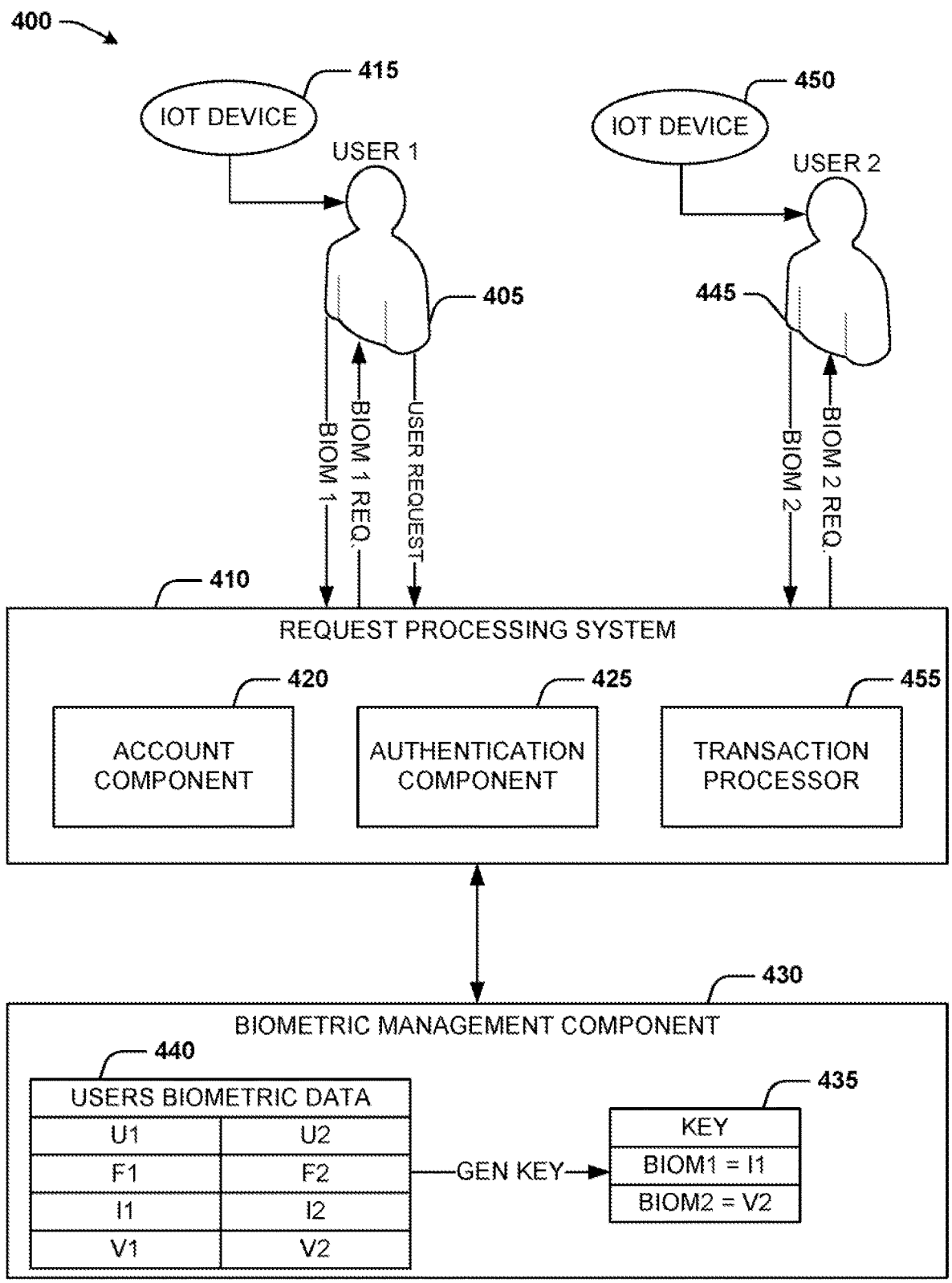
FIG. 4 illustrates a system diagram for using composite biometric authentication in accordance with aspects of the innovation.

FIG. 4 illustrates a system 400 for authenticating a transaction via composite biometric authentication. A first user 405 can generate and send (e.g., via a mobile device) a user request to a request processing system 410. The user request may include a transaction request, access request, shared account details, transaction details, user login credentials, and/or the like. In some embodiments, the first user 405 can generate the user request on a first IOT device 415. The first IOT device 415 can be a mobile device, phone, wearable device, and/or the like to submit user requests to the request processing system 410.

The request processing system 410 receives the user request for processing. The request processing system 410 can parse or analyze the user request to determine account identification and other account details and/or transaction details. The request processing system 410 includes an account component 420. The account component 420 can receive account details from the user request. The account component 420 can interface with a financial institution and/or the like to look up accounts associated with the first user 405. The account component 420 can determine whether the account details refer to a shared account having multiple users. The account component 420 can determine whether the shared account with multiple users has been enrolled for composite biometric authentication.

In some embodiments, composite biometric authentication can be triggered according to business rules. The request processing system 410 and/or the account component 420 can parse the user request to determine whether the user request triggers a business rule. Example business rules can be a transaction type (e.g. a withdrawal or e-check), a transaction amount above a predetermined threshold (e.g. a dollar amount or percentage of total shared account value), a type of user request (e.g. a request to close or alter the shared account), and/or the like. When the user request triggers a business rule, the request processing system 410 can determine composite biometric authentication is necessary to complete the user request.

The request processing system 410 includes an authentication component 425. When composite biometric authentication is applicable for the shared account to process the user request, the authentication component 425 queries a biometric management component 430 for a reference composite biometric key 435. The biometric management component 430 can store or generate the reference composite biometric key 435. The reference composite biometric key 435 includes a biometric for each user of the multiple users associated with the shared account. For example, the reference composite biometric key 430 can include an ins biometric of the first user 405, I1, and a voice biometric of a second user 445, V2.

The biometric management component 430 can store a biometric composite 440. The biometric composite 440 includes sets of user biometrics for each user of the multiple users associated with the shared account as described in detail above. In some embodiments, the biometric management component 430 can generate the reference composite biometric key 435 upon the request processing system 410 receiving the user request, upon a triggered business rule, and/or upon receiving a request for a reference composite biometric key 435 from the authentication component 425 and/or the request processing system 410.

The authentication component 425 receives the reference composite biometric key 435 from the biometric management component 430. The authentication component 425 can determine the user-specific biometrics included in the reference composite biometric key 435. The authentication component 425 can send biometric requests to each user associated with the shared account and/or each user included in the reference composite biometric key 435. The authentication component 425 can request at least a first biometric input from the first user 405 and a second biometric input from the second user 445. Each request can include an indication of the type of biometric each user should provide. For example, if the reference composite biometric key 435 includes the iris of the first user 405 and the voice of the second user 445, the request to the first user 405 includes an indication requesting an iris biometric input and the request to the second user 445 includes an indication requesting a voice biometric input.

The request may be sent to the first IOT device 415 associated with the first user 405 and a second IOT device 450 that is associated with the second user 445. The first IOT device 415 and/or second IOT device 450 can be a biometric scanner, mobile phone, wearable device, and/or the like to record various biometric inputs. The first user 405 can record and send a first biometric input with the first IOT device 415. The second user 445 can record and send a second biometric input with the second IOT device 450. The first biometric input and the second biometric input can be sent to the authentication component 425.

The authentication component 425 receives the first biometric input and the second biometric input. The authentication component 425 combines the first biometric input and the second biometric input to generate an input composite biometric key. The input composite biometric key includes the first biometric input and the second biometric input. The authentication component 425 compares the input composite biometric key to the reference composite biometric key 435. If the authentication component 425 determines the input composite biometric key matches the reference composite biometric key 435, the authentication component 425 authenticates the first user and the second user as the multiple users associated with the shared account. The authentication component 425 authorizes the user request to be completed. For example, the user request is a request to complete a transaction on a joint shared account. If the input composite biometric key matches the reference composite biometric key, the authentication component 425 authenticates the user request and authorizes the transaction to proceed.

It is to be appreciated that other factors and criteria can be gathered and processed via the authentication component 425 in order to grant or deny authentication. In examples, the MAC (media access control) address, IP (internet protocol) address, IMEI (international mobile equipment identity) or other unique identification of an IOT device can be employed to further enhance and be utilized in the authentication decisioning. Still further, GPS (global positioning system) location can be employed in the analysis to further mitigate spoofing, fraud or the like.

The request processing system 410 includes a transaction processor 455. The transaction processor 455 can complete transactions and other user requests associated with the shared account. For instance, in accordance with the bank account scenario, the transaction processor 455 can interface with a financial institution and/or the like to complete user requests and/or the like. If a user request is authenticated by the authentication component 425, the transaction processor 455 can complete the user request.

Figure 5:
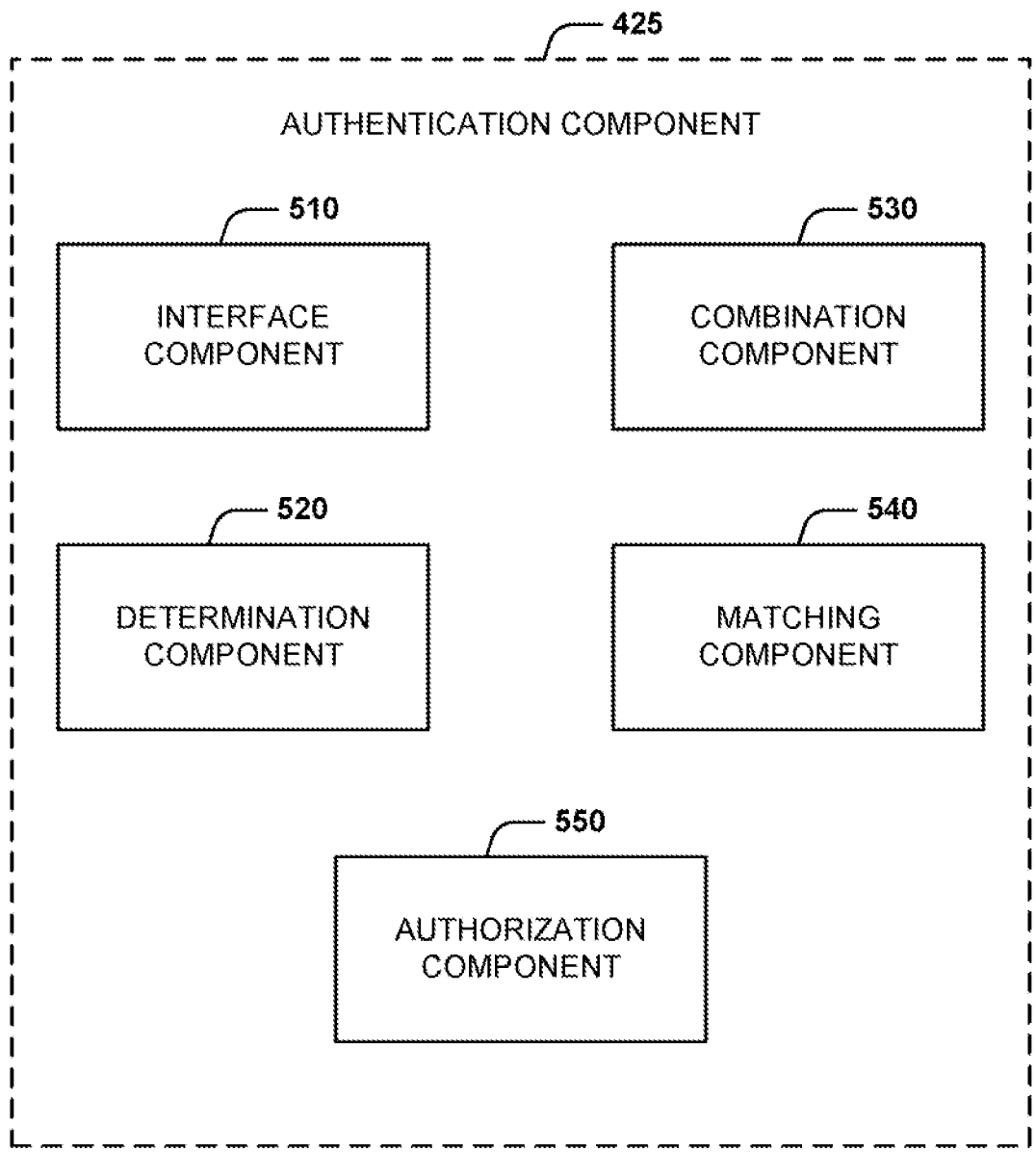
FIG. 5 illustrates an example component diagram of an authentication component in accordance with aspects of the innovation.

FIG. 5 illustrates an example component diagram of an authentication component 425. The authentication component 425 includes an interface component 510. When composite biometric authentication is used for the shared account to process the user request, the interface component 510 queries a biometric management component 430 (FIG. 4) for a reference composite biometric key 435. The reference composite biometric key 435 includes at least one biometric attribute for each user of the multiple users associated with the shared account. For example, the reference composite biometric key 430 can include an ins biometric of the first user 405 and a voice biometric of a second user 445.

The interface component 510 receives the reference composite biometric key 435 from the biometric management component 430. The authentication component 425 can include a determination component 520. The determination component 520 can determine, conclude or otherwise establish the user-specific biometrics included in the reference composite biometric key 435. The interface component 510 can send biometric requests to each user associated with the shared account and/or each user included in the reference composite biometric key 435. The interface component 510 can request a first biometric input from the first user 405 and a second biometric input from the second user 445. Each biometric request can include an indication of the type of biometric each user should provide. For example, if the reference composite biometric key 435 includes the iris of the first user 405 and the voice of the second user 445, the request to the first user 405 includes an indication requesting an iris biometric input and the request to the second user 445 includes an indication requesting a voice biometric input.

The interface component 510 sends the biometric request to the first IOT device 415 associated with the first user 405 and the second IOT device 450 that is associated with the second user 445. The interface component 510 receives the first biometric input and the second biometric input. As described above, unique identification criteria of the IOT's can be employed in addition to the biometric data, e.g., to establish validity and mitigate fraud. As part of the enrollment process, an IOT device or group of approved devices can be registered at the same time (or other time) as when providing the biometric data/attributes.

The authentication component 425 includes a combination component 530. The combination component 530 combines the first biometric input and the second biometric input to generate an input composite biometric key. The input composite biometric key includes, at least, the first biometric input and the second biometric input.

The authentication component 425 includes a matching component 540. The matching component 540 compares the input composite biometric key to the reference composite biometric key 435. If the matching component 540 determines the input composite biometric key matches the reference composite biometric key 435, the authentication component 425 authenticates the user request, the first user, and the second user as the multiple users associated with the shared account. The authentication component 425 includes an authorization component 550. The authorization component 550 authorizes the user request to be completed when the user request is authenticated. For example, the user request is a request to complete a transaction on a joint shared account. If the input composite biometric key matches the reference composite biometric key, e.g. if the users are authenticated, the authorization component 550 authorizes the transaction to proceed.

It is to be appreciated that thresholds can be employed by the matching component 540. For example, in aspects, there can be an acceptable degree of error or acceptable deviation from the stored key while still granting authorization and/or authorization. Further, the threshold can be commensurate with the scope and/or type of request (e.g., a more stringent threshold for a higher dollar transaction, etc.)

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but appreciated by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Among other things, such components can automate certain mechanisms or processes performed thereby to make portions of the systems and methods more adaptive as well as efficient and intelligent. By way of example, and not limitation, such mechanisms can be utilized by the request processing system 410 for composite biometric authentication.

Figure 6:
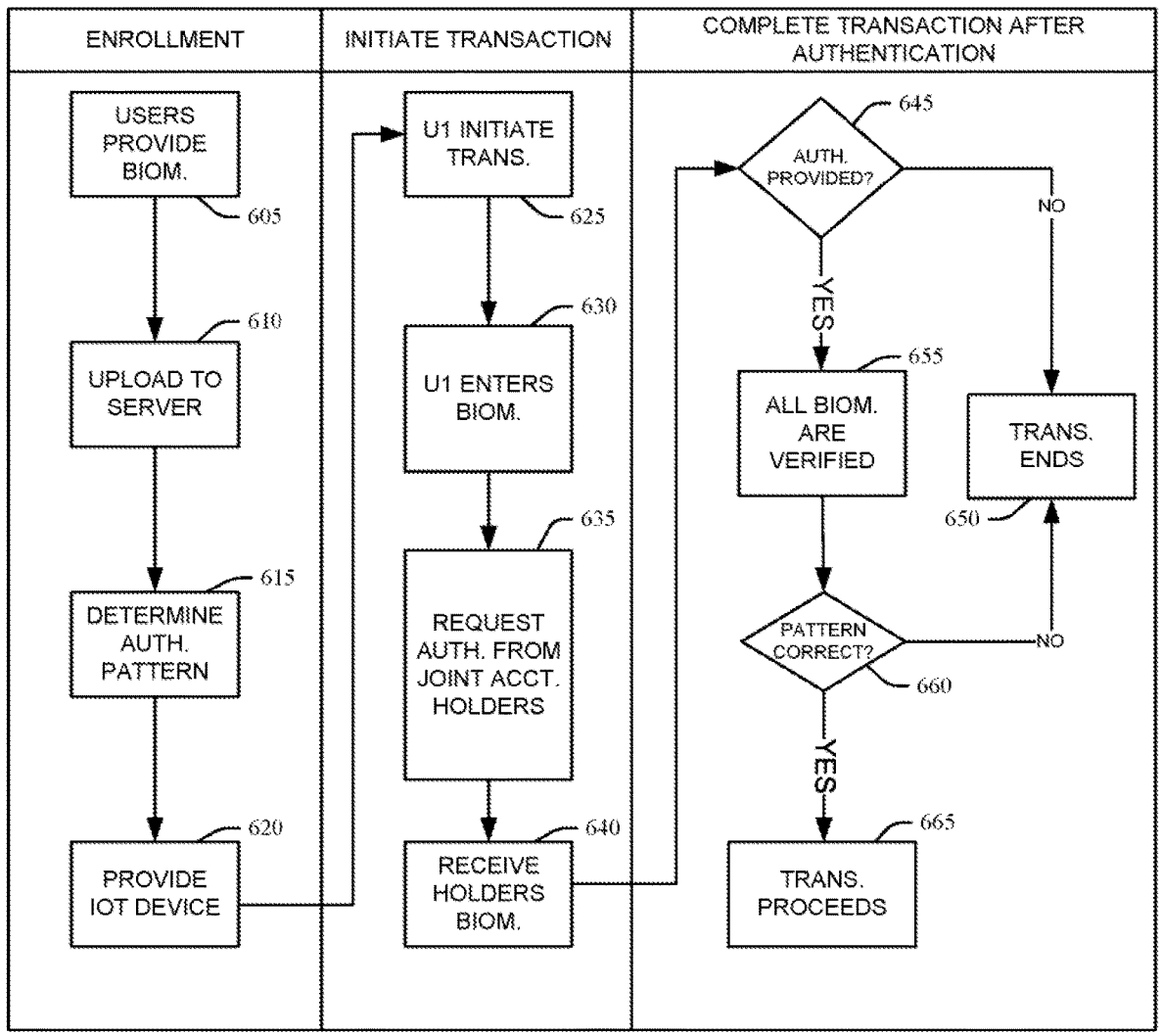
FIG. 6 illustrates a method for enrolling and using composite biometric authentication in accordance with aspects of the innovation.

In view of the example systems described above, methods that may be implemented in accordance with the disclosed subject matter will be better appreciated with reference to flow chart diagram of FIG. 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 6 illustrates a method 600 for enrollment and use of composite biometric authentication. At 605, users provide multiple biometrics to enroll a shared account for composite biometric authentication. For example, four siblings (U1, U2, U3, U4) have a joint trust account accessible by each user. The joint trust account can be enrolled for composite biometric authentication to require that two or morn sibling users must provide biometrics to complete a transaction with the joint trust account. In some embodiments, the users provide various biometrics of themselves using an JOT device or other biometric scanner. Similarly, unique identification attributes and criteria of IOT devices can be provided to further enhance fraud mitigation.

At 610, the user biometrics are uploaded to a server, e.g. a biometric management component 120. In the example, each of the four siblings provides fingerprint (F1, F2, F3, F4), iris (I1, I2, I3, I4), and voice (V1, V2, V3, V4) references to upload to the biometric management component 120 and associated with the joint trust account. At 615, a reference authentication pattern or reference composite biometric key is determined from the provided biometrics. The reference composite biometric key can be unique to a user. Continuing the example, the first user U1 may have a reference composite biometric key via U1, V1, F2, I3, and V4 while the second user U2 may have a reference composite biometric key via U2, I1, F3, I2 and V4. The user request may be authenticated using the first user's reference composite biometric key as the first user initiated the transaction.

In some embodiments, two users may need to provide their reference composite biometric keys. In the example, the total combination to transact would be: <U1, V1, F2, I3, and V4> and <U2, I1, F3, I2 and V4>. In this embodiment, if the wrong finger is used, then the authentication fails, and the transaction is denied. At 620, each user can be provided with an IOT device 415, 430. The IOT devices may be a biometric scanner, mobile device, wearable, and/or the like.

At 625, a first user may initiate a transaction regarding the shared account. The first user 405 can provide a user request to a request processing system 410. For example, U1 may request a withdrawal from the joint trust account. At 630, the first user can enter the biometric required of them in their unique reference composite biometric key. For example, U1's reference composite biometric key requires U1 to provide a voice biometric. The first user can provide the biometric via their IOT device 415. In some embodiments, the first user can provide the biometric in their reference composite biometric key concurrently with the request to initiate the transaction.

In some embodiments, it is contemplated that not all users share the account. In this embodiment, two users (e.g. U1, U2) share the financial account to receive the benefits of the shared account and one or two users (e.g. U3, U4) are trustees of the account that may only be used for authentication purposes. U1 and U1 may initiate a transaction, however to authenticate the transaction calls for biometrics from U1, U2, U3, and U4.

At 635, a request for authentication can be sent to the joint account holders. In the example, a request is sent to U2, U3, and U4 to provide their biometric associated with U1's reference composite biometric key to the request processing system 410 or authentication component 420. In some embodiments, the request can include an identification of which biometric to provide, e.g. fingerprint, ins, or voice. At 640, the biometrics from the other joint account holders are received. The joint account holders can provide their biometrics with their respective IOT devices. In the example, U1's reference composite biometric key calls for F2, I3, and V4. Each user can provide their respective biometric for the U1 reference composite biometric key.

At 645, a determination is made whether every authentication biometric has been received. If each biometric to complete a reference composite biometric key is not received, at 650, the transaction ends. If each biometric is received to complete U1's reference composite biometric key, at 655, each biometric is verified against the provided biometrics previously uploaded to the biometric management component 430, at 610, to determine if they match at the authentication component 425.

At 660, a determination is made whether the received biometrics match the reference composite biometric key. The received biometrics can be combined into an input composite biometric key and compared to the reference composite biometric key. For example, the received biometrics of the four siblings are combined into the input composite biometric key <U1, V1, F2, I3, and V4>. The input composite biometric key is matched to the reference composite biometric key to determine if there is a match (or satisfactory matched threshold) by an authentication component 425. If the input composite biometric key does not match the reference composite biometric key, the transaction ends at 650. For example, if the input composite biometric key is submitted with I4 instead of V4, the pattern would not match the reference composite biometric key requiring V4 and the transaction would be ended before completion because the right biometric for U4 was not provided. If the input composite biometric key matches the reference composite biometric key, at 665, the user request is authenticated and the transaction proceeds. In the example, the withdrawal from the joint trust account is authenticated and authorized, and executed by a transaction processor 455.

The innovation disclosed and claimed herein, in one aspect thereof, comprises systems and methods of composite biometric authentication. As described, the method comprises receiving a user request to complete a transaction regarding a shared account, wherein the shared account having at least two users associated with the shared account; generating at least one reference composite biometric key, the composite biometric key being a combination of a first biometric reference from a first user and a second biometric reference from a second user of the at least two users associated with the shared account; requesting and receiving a first biometric input from a first user and a second biometric input from the second user; combining the first biometric input and the second biometric input to generate an input composite biometric key; determining a match between the reference composite biometric key and the input composite biometric key to authenticate the user request; and authorizing the transaction upon authenticating the user request.

A system, comprising a processor coupled to a memory that stores instructions that when executed cause the processor to: receive a user request to complete a transaction regarding a shared account, wherein the shared account having at least two users associated with the shared account; generate at least one reference composite biometric key, the composite biometric key being a combination of a first biometric reference from a first user and a second biometric reference from a second user of the at least two users associated with the shared account; request and receiving a first biometric input from a first user and a second biometric input from the second user; combine the first biometric input and the second biometric input to generate an input composite biometric key; determine a match between the reference composite biometric key and the input composite biometric key to authenticate the user request; and authorize the transaction upon authenticating the user request.

A computer readable medium having instructions to control one or more processors configured to receive a user request to complete a transaction regarding a shared account, wherein the shared account having at least two users associated with the shared account; request and receive a first biometric input from a first user and a second biometric input from the second user; combine the first biometric input and the second biometric input to generate an input composite biometric key; determine a match between the reference composite biometric key and the input composite biometric key to authenticate the user request; and authorize the transaction upon authenticating the user request.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running an a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X'" and "Y'." For example, if "'A' employs 'X,'" "'A employs 'Y,'" or "'A' employs both 'X' and 'Y.'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
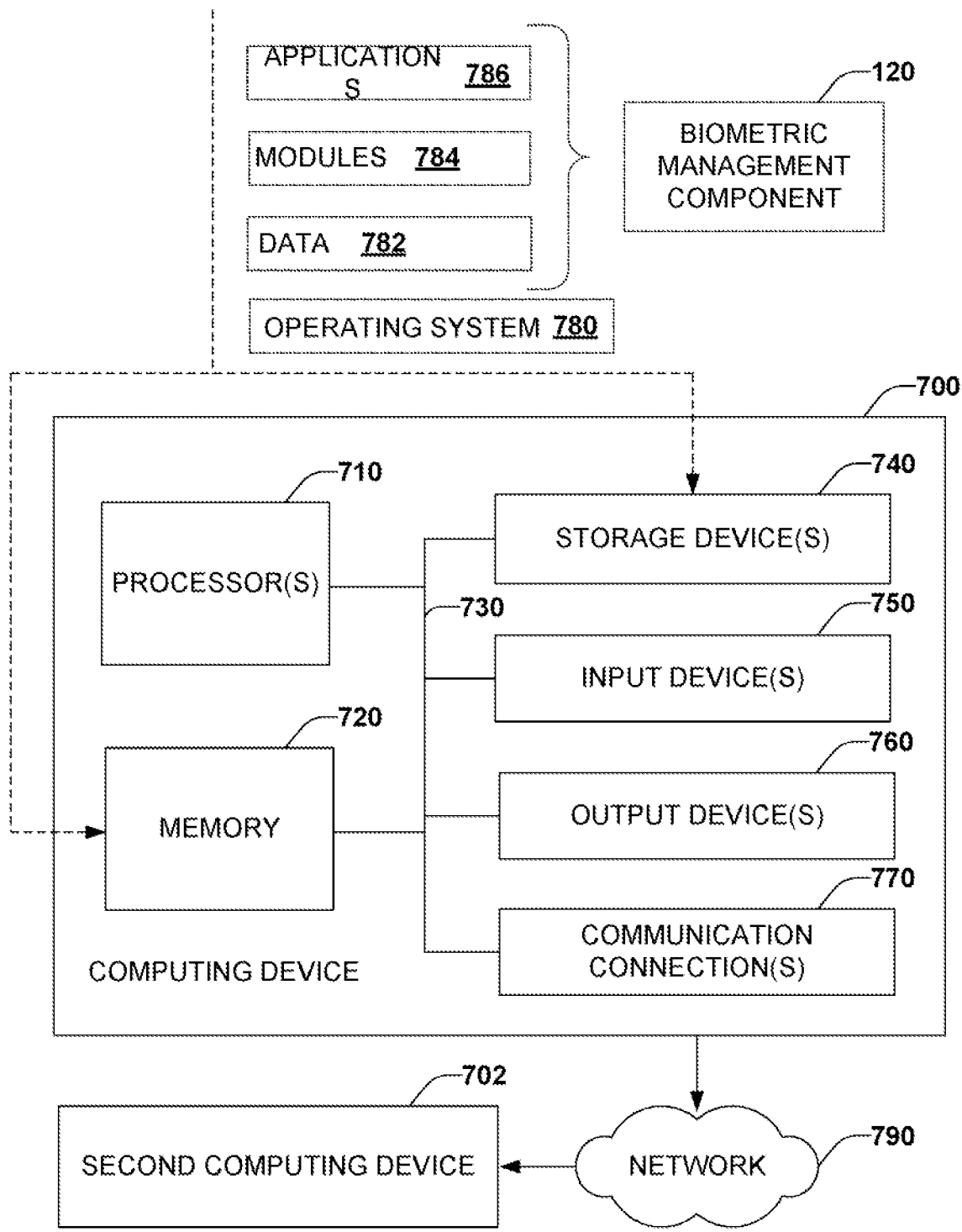
FIG. 7 illustrates a computing environment where one or more of the provisions set forth herein can be implemented, according to some embodiments.

To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node . . . ). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that accessible to the computing device 700 and includes volatile and non-volatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 820 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the biometric management component 120 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the biometric management component 120 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi. Bluetooth . . . ), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (VAN) such as the Internet. The second computing device 702 can be another processor-based device with which the computing device 700 can interact. For example, the computing device 700 can correspond to a server that executes functionality of biometric management component 120, and the second computing device 702 can be a user device that communications and interacts with the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method for authorizing an action associated with a resource shared between a first user and a second user, the method comprising:
   generating a first reference composite biometric key by combining a first enrollment biometric input of a first type of the first user and a second enrollment biometric input of a second type of the second user;
   generating a second reference composite biometric key by combining a third enrollment biometric input of the first user and a fourth enrollment biometric input of the second user, wherein at least one of the third enrollment biometric input and the fourth enrollment biometric input is of a third type;
   in response to a request to perform the action, initiating a first composite biometric authentication process comprising:
      receiving a first biometric input and a third biometric input from the first user and a second biometric input and a fourth biometric input from the second user;
      generating a first input composite biometric key by combining the first biometric input and the second biometric input;
      generating a second input composite biometric key by combining the third biometric input and the fourth biometric input; and
      authorizing the action in response to (i) the first input composite biometric key and the first reference composite biometric key satisfying a match threshold and (ii) the second input composite biometric key and the second reference composite biometric key satisfying the match threshold.

2. The method of claim 1, wherein generating the reference composite biometric key comprises:
   randomizing a selection of the first enrollment biometric input; and
   randomizing a selection of the second enrollment biometric input,
   wherein randomizing the selection of the first enrollment biometric input and the second enrollment biometric input comprises determining that the first reference composite biometric key is not a repeated reference composite biometric key.

3. The method of claim 1, further comprising:
   in response to a second request to perform a second action, initiating a second composite biometric authentication process comprising:
      selecting, based on the second user being associated with the request, a third reference composite biometric key from a plurality of stored user-specific reference composite biometric keys associated with the second user;
      receiving a fifth biometric input from the first user and a sixth biometric input from the second user;
      generating a third input composite biometric key based on the fifth biometric input and the sixth biometric input; and
      authorizing the second action in response to the third input composite biometric key and the third reference composite biometric key satisfying the match threshold.

4. The method of claim 1, wherein the request comprises a unique identification of a device associated with the first user, and wherein the authorization of the action associated with the request is further based on the unique identification of the device.

5. The method of claim 1, further comprising:
   evaluating the request in connection with at least one of: a type of the action associated with the request, monetary value associated with the request, a location associated with the first user, a date associated with the request, and a time associated with the request; and
   initiating the first composite biometric authentication process in response to the evaluation of the request.

6. A system for authorizing an action associated with a resource shared between a first user and a second user, the system comprising a processor coupled to a memory that stores instructions that when executed cause the processor to:
   generate a first reference composite biometric key by combining a first enrollment biometric input of a first type of a first user and a second enrollment biometric input of a second type of a second user:
   generate a second reference composite biometric key by combining a third enrollment biometric input of the first user and a fourth enrollment biometric input of the second user, wherein at least one of the third enrollment biometric input and the fourth enrollment biometric input is of a third type:
   in response to a request associated with a first user to perform the action, initiate a first composite biometric authentication process comprising:
      receiving a first biometric input and a third biometric input from the first user and a second biometric input and a fourth biometric input from the second user;
      generating a first input composite biometric key by combining the first biometric input and the second biometric input;
      generating a second input composite biometric key by combining the third biometric input and the fourth biometric input; and
      authorizing the action based in response to (i) the first input composite biometric key and the first reference composite biometric key satisfying a match threshold and (ii) the second input composite biometric key and the second reference composite biometric key satisfying the match threshold.

7. The system of claim 6, wherein the instructions that cause the processor to generate the first reference composite biometric key comprise instructions that, when executes, cause the processor to:
   randomize a selection of the first enrollment biometric input; and
   randomize a selection of the second enrollment biometric input,
   wherein randomizing the selection of the first enrollment biometric input and the second enrollment biometric input comprises determining that the first user-reference composite biometric key is not a repeated reference composite biometric key.

8. The system of claim 6, further comprising instructions that, when executed, cause the processor to:
   in response to a second request to perform a second action, initiating a second composite biometric authentication process comprising:
      selecting, based on the second user being associated with the request, a third reference composite biometric key from a plurality of stored user-specific reference composite biometric keys associated with the second user;

receiving a fifth biometric input from the first user and a sixth biometric input from the second user;

generating a third input composite biometric key based on the fifth biometric input and the sixth biometric input; and authorizing the second action in response to the third input composite biometric key and the third reference composite biometric key satisfying the match threshold.

9. The system of claim 6, wherein the request comprises a unique identification of a device associated with the first user, and wherein the authorization of the action associated with the request is further based on the unique identification of the device.

10. The system of claim 6, further comprising instructions that, when executed, cause the processor to:

evaluate the request in connection with at least one of: a type of the action associated with the request, monetary value associated with the request, a location associated with the first user, a date associated with the request, and a time associated with the request; and initiate the first composite biometric authentication process in response to the evaluation of the request.

11. A non-transitory computer-readable medium having instructions to control one or more processors configured to:

generating a first reference composite biometric key by combining a first enrollment biometric input of a first type of a first user and s second enrolment biometric input of a second type of a second user:

generating a second reference composite biometric key by combining a third enrollment biometric input of the first user and a fourth enrollment biometric input of the second user, wherein at least one of the third enrollment biometric input and the fourth enrollment biometric input is of a third type; and in response to a request to perform an action, a first composite biometric authentication process comprising:

receiving a first biometric input and a third biometric input from the first user and a second biometric input and a fourth biometric input from the second user;

generating a first input composite biometric key by combining the first biometric input and the second biometric input;

generating a second input composite biometric key by combining the third biometric input and the fourth biometric input; and authorizing the action in response to (i) the first input composite biometric key and the first reference composite biometric key satisfying a match threshold and (ii) the second input composite biometric key and the second reference composite biometric key satisfying the match threshold.

12. The computer-readable medium of claim 11, wherein the instructions that are configured to generate the first reference composite biometric key are further configured to:

randomize a selection of the first enrollment biometric input; and randomize a selection of the second enrollment biometric input, wherein randomizing the selection of the first enrollment biometric input and the second enrollment biometric input comprises determining that the first reference composite biometric key is not a repeated reference composite biometric key.

13. The computer-readable medium of claim 11, wherein the instructions are further configured to:

in response to a second request to perform a second action, initiating a second composite biometric authentication process comprising:

selecting, based on the second user being associated with the request, a third reference composite biometric key from a plurality of stored user-specific reference composite biometric keys associated with the second user;

receiving a fifth biometric input from the first user and a sixth biometric input from the second user;

generating a third input composite biometric key based on the fifth biometric input and the sixth biometric input; and authorizing the second action in response to the third input composite biometric key and the third reference composite biometric key satisfying the match threshold.

14. The computer-readable medium of claim 11, wherein the request comprises a unique identification of a device associated with the first user, and wherein the authorization of the action associated with the request is further based on the unique identification of the device.

15. The computer-readable medium of claim 11, wherein the instructions are further configured to:

evaluate the request in connection with at least one of: a type of the action associated with the request, monetary value associated with the request, a location associated with the first user, a date associated with the request, and a time associated with the request; and initiate the first composite biometric authentication process in response to the evaluation of the request.

16. The method of claim 1, further comprising:

storing a first association between the first user and the first reference composite biometric key; and storing a second association between the second user and the second reference composite biometric key, wherein determining whether the first input composite biometric key satisfies the match threshold is based at least on the stored first association and determining whether the second input composite biometric key satisfies the match threshold is based at least on the stored second association.

17. The system of claim 6, further comprising instructions, that when executed, cause the processor to:

store a first association between the first user and the first reference composite biometric key; and store a second association between the second user and the second reference composite biometric key, wherein determining whether the first input composite biometric key satisfies the match threshold is based at least on the stored first association and determining whether the second input composite biometric key satisfies the match threshold is based at least on the stored second association.

18. The computer-readable medium of claim 11, wherein the instructions are further configured to:

store a first association between the first user and the first reference composite biometric key; and store a second association between the second user and the second reference composite biometric key, wherein determining whether the first input composite biometric key satisfies the match threshold is based at least on the stored first association and determining whether the second input composite biometric key satisfies the match threshold is based at least on the stored second association.

19. The method of claim 1, wherein the resource comprises a financial account.

20. The system of claim 6, wherein the resource comprises a financial account.

* * * * *